United States Patent [19]
Kaise et al.

[11] Patent Number: 5,852,594
[45] Date of Patent: *Dec. 22, 1998

[54] ELECTRONIC EQUIPMENT AND RECORDING AND/OR REPRODUCING APPARATUS FOR RECORDING MEDIUM

[75] Inventors: Kazuhito Kaise; Masahiro Higuchi; Kenji Sasaki; Tsunenori Sato, all of Tokyo, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 769,539

[22] Filed: Dec. 19, 1996

[30] Foreign Application Priority Data

Dec. 29, 1995 [JP] Japan .................................. 7-352639

[51] Int. Cl.⁶ ........................... G11B 33/02; G11B 5/016
[52] U.S. Cl. ....................................... 369/75.1; 360/99.02
[58] Field of Search .................... 369/75.1, 75.2, 369/77.1–77.2, 191–192, 178, 6, 10–13; 360/99.06, 99.12, 99.02

[56] References Cited

U.S. PATENT DOCUMENTS 4,683,511  7/1987  Kara ........................................ 360/132
5,202,585  4/1993  Aoyagi et al. ............................ 369/11
5,278,808  1/1994  Takano ...................................... 369/12
5,637,928  6/1997  Nakajima et al. ........................ 369/11

FOREIGN PATENT DOCUMENTS

2-29985  1/1990  Japan .................................... 369/75.1
8702502  4/1987  WIPO .................................... 369/75.1

Primary Examiner—Allen T. Cao
Attorney, Agent, or Firm—Jay H. Maioli

[57] ABSTRACT

An electronic apparatus, such as a car stereo, includes a main apparatus portion, a front panel and a supporting mechanism. The front panel has an operating portion having at least an operating switch. The front panel is provided on the front side of the main apparatus portion. The supporting mechanism rotatably supports the front panel relative to the front surface of the main apparatus portion. The supporting mechanism also supports the front panel for rotation between a position parallel to the front surface of the main apparatus portion and a position rotated from the front side of the main apparatus. The supporting mechanism is made up of the front panel, a shaft portion provided on one of the front panel and the main apparatus portion and a bearing provided in the other of the front panel and the main apparatus portion. One of the shaft and the bearing is movable in the direction of the rotational axis.

8 Claims, 6 Drawing Sheets

ELECTRONIC EQUIPMENT AND RECORDING AND/OR REPRODUCING APPARATUS FOR RECORDING MEDIUM

BACKGROUND OF THE INVENTION

1. Field of the Invention

This invention relates to an electronic equipment and a recording and/or reproducing apparatus for a recording medium. More particularly, it relates to an electronic equipment having a front panel and a recording and/or reproducing apparatus for a recording medium having a front panel.

2. Description of the Related Art

The electronic equipment and a recording and/or reproducing apparatus for a recording medium are mounted in the vicinity of a driver seat of a vehicle for improving, for example, the living feeling in the vehicle. For mounting the electronic equipment in the limited space within the vehicle, attempts are being made for reducing the size of the electronic equipment because of limited mounting space for the electronic equipment in the vehicle. In keeping up with the increased performance of the electronic equipment, certain electronic equipments simultaneously have the function of recording and/or reproducing a tape-shaped recording medium and the function of recording and/or reproducing a disc-shaped recording medium.

For example, the recording and/or reproducing apparatus mounted in the vicinity of a driver seat of a vehicle has an aperture for insertion of a tape-shaped recording medium or a disc-shaped recording medium and a first operating unit comprised of an operating key for performing the basic operation, such as recording and/or reproduction, when the recording medium is mounted within the recording and/or reproducing apparatus. A container box for holding plural recording media at a time may be separately mounted in this recording and/or reproducing apparatus. In such case, the recording and/or reproducing apparatus has a memory function of storing part of the information recorded on the recording medium and the information for program reproduction of the recording media.

With the above-described recording and/or reproducing apparatus, having the multiple functions, the reproducing operation, for example, is performed by inserting the recording medium via a recording medium insertion aperture and by actuating the actuating key provided on the first operating unit.

However, the above-described recording and/or reproducing apparatus, as electronic equipment, has come to have multiple functions in keeping with function diversification, as a result of which the number of the operating keys is also increased and a further space is required for accommodating the first operating unit. However, spatial limitations are imposed on the electronic equipment which is mounted in the limited space within the vehicle, as mentioned above. For overcoming these defects, the following electronic equipment has been proposed.

The proposed electronic equipment is made up of an operating panel having a first operating unit and a main mounting member on which an operating panel is mounted for opening/closure and which has a second operating unit. Thus the first operating unit is mounted facing the outer side when the operating panel is in the closed position. As to the first operating unit, the operating keys frequently used are mounted facing the outer side of the operating panel. For example, in the recording and/or reproducing apparatus, the playback key, recording key or the volume adjustment key are provided in this manner. Since the frequently used operating keys are provided in this manner on the operating panel, the electronic equipment is improved in operability. With the operating panel being closed, a second operating unit is provided on the side of the main mounting member facing the operating panel. On this second operating unit are mounted operating keys which are used less frequently. The mounting main member is provided with an insertion aperture for a recording medium for loading the recording medium within the recording and/or reproducing apparatus.

Thus, with the above-described recording and/or reproducing apparatus, as electronic apparatus, the recording medium is inserted via recording medium insertion aperture with the operating panel in the closed position. For reproducing the recording medium inserted into the recording and/or reproducing apparatus, the operating key provided on the first operating unit, such as playback key, is actuated for reproducing the recording medium.

The electronic equipment has multifarious functions, as described above, such that it is expensive, while it is prone to theft. Thus it has become necessary to render it difficult to remove the operating panel from outside to recognize that the apparatus is the electronic equipment.

SUMMARY OF THE INVENTION

It is therefore an object of the present invention to provide an electronic equipment which resolves the above-mentioned problems.

It is another object of the present invention to provide a recording and/or reproducing apparatus which resolves the above-mentioned problems.

According to the present invention, there is provided an electronic apparatus including a main apparatus portion and a front panel having an operating unit including at least an operating switch. The front panel is arranged on the front side of the main apparatus portion. The electronic apparatus also includes a supporting mechanism for rotatably supporting the front panel relative to the main apparatus portion. The supporting mechanism supports the front panel for rotation between a position parallel to the front surface of the main apparatus portion and a position rotated from the front surface of the main apparatus portion. The supporting mechanism includes a shaft provided in one of the front panel and the main apparatus portion and a bearing mounted in the other of the front panel and the main apparatus portion, one of the shaft and the bearing being movable in the direction of the rotational axis.

According to the present invention, there is also provided a recording and/or reproducing apparatus for a recording medium including a main apparatus portion for housing recording and/or reproducing means for the recording medium, with an insertion/ejection aperture for the recording medium being formed on the front side of the main apparatus portion, and a front panel having an operating unit having at least one operating switch. The front panel is arranged on the front side of the main apparatus portion. The recording and/or reproducing apparatus also includes a supporting mechanism for supporting the front panel for rotation relative to the main apparatus portion. The supporting mechanism supports the front panel for rotation between a position closing the aperture in the main apparatus portion and a position opening the aperture. The supporting mechanism includes a shaft provided in one of the front panel and the main apparatus portion and a bearing mounted in the other of the front panel and the main apparatus portion. One of the shaft and the bearing is movable in the direction of the rotational axis.

DESCRIPTION OF THE PREFERRED EMBODIMENTS

Referring to the drawings, a first embodiment of an electronic equipment according to the present invention will be explained in detail.

In the embodiment, now explained, the present invention is applied to a recording and/or reproducing apparatus mounted in the vicinity of a driver seat of a vehicle, as shown in FIGS. 1 through 7. With the present recording and/or reproducing apparatus 1, the operation of performing various functions may be stored in association with an operating key as desired by the user.

Figure 1:
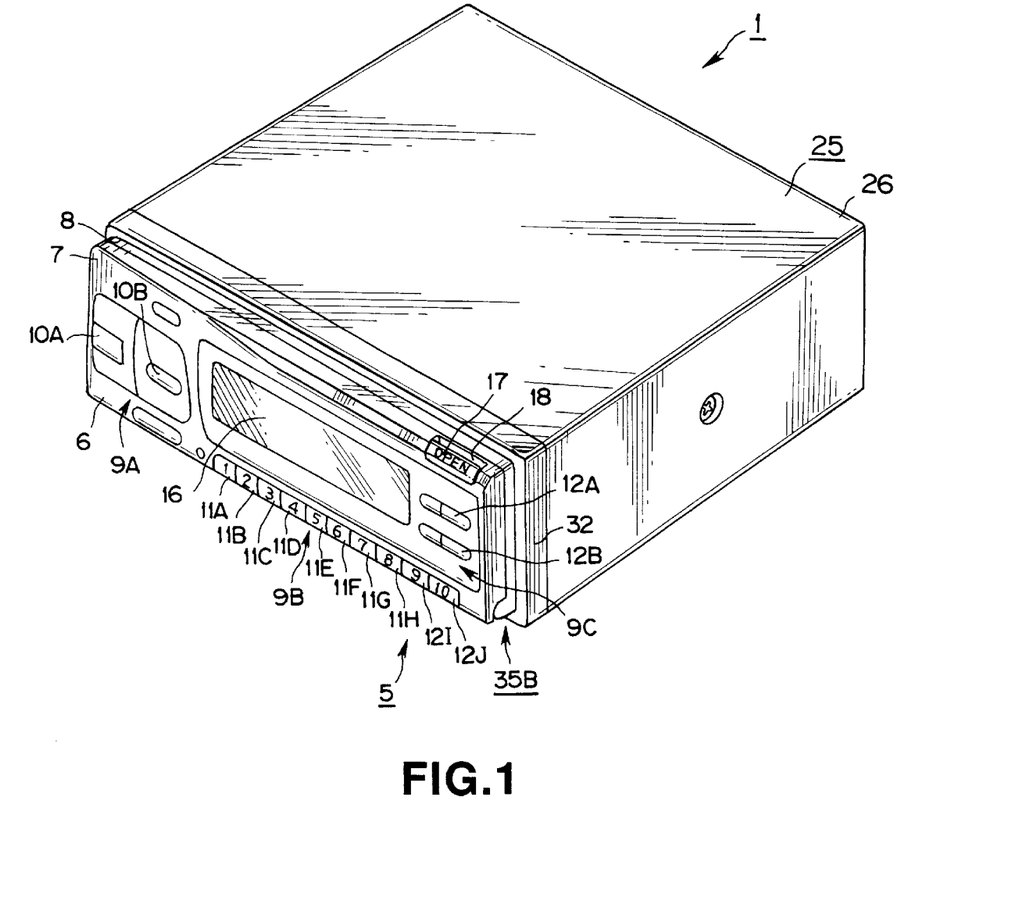
FIG. 1 is a perspective view of a recording and/or reproducing apparatus according to the present invention.

The recording and/or reproducing apparatus 1 has an operating panel 5 having first operating units 9A, 9B and 9C, a main apparatus portion 25 for rotatably mounting the operating panel 5 and supporting units 35A, 35B for supporting the operating panel 5 on the main apparatus portion 25 for opening/closure, as shown for example in FIG. 1.

The operating panel 5 includes a panel casing 6, a display area 16 arranged at a mid portion of a major surface of the panel casing 6, first operating units 9A through 9C arranged on the outer peripheral surface of the display area 16 flush with the display area 16, and an opening/closure switch 17 arranged flush with the display area 16 in the vicinity of the upper corner.

The panel casing 6 is formed of a synthetic resin material, such as polyacetal resin, and is formed in the overall shape of a parallelepiped by abutting and connecting an upper half 7 and a lower half 8 to each other. Within the panel casing 6 is housed a printed circuit board on which is formed an electric circuit for driving a switch and the display area 16 operated by actuation of the first operating units 9A through 9C.

The first operating units 9A through 9C are constituted by plural keys which are arranged on the major surface of the upper half 7 of the panel casing 6 around the periphery of the display area 16.

F the plural operating keys making up the first operating unit 9A, the operating key 10A is used for executing the recording and/or reproducing function of the loaded tape cassette, while the operating key 10B is used for executing the function for stopping the operation of the recording and/or reproducing mechanism, not shown, provided within the casing of the main apparatus portion 25.

On the surfaces of plural operating keys 11A, 11B, 11C, 11D, 11E, 11F, 11G, 11H, 11I and 11J, making up the first operating unit 9B, there are indicated numbers of from 1 to 10. These operating keys 11A through 11J are used for directly searching and/or reproducing the desired music information on the magnetic tape by actuating one of the operating keys 11A through 11J associated with the desired music information on the magnetic tape on loading the tape cassette 80 on the magnetic tape of which are recorded plural musical signals.

The operating key 12A of the first operating unit 9C is used for executing the function of adjusting the sound volume of the musical signals being reproduced, while the operating key 12B is used for executing the function similar to that executed by the operating key 12A.

By virtue of the above-described memory function, the operating functions of the operating keys 10A, 10B, 11, 12A and 12B can be modified for facility of operation by the user, without limitation to the above-described functions.

The display area 16 is constituted by a rectangular liquid crystal panel formed at a mid portion of a major surface of the upper half 7 of the panel casing 6. On the display area 16, the contents actuated by the operating key of the first operating unit 9 is displayed. That is, if a wound tape cassette is loaded in the recording medium in the recording and/or reproducing apparatus, the display is made for indicating that the tape cassette 80 has been loaded in the apparatus, whereas, if the tape cassette 80 loaded into the apparatus is being recorded and/or reproduced, the display is made for indicating that the recording medium is being recorded and/or reproduced.

The opening/closure switch 17 is arranged in the vicinity of the upper corner of a major surface of the panel casing 6. The opening/closure switch 17 is provided with an operating unit 18, an extending spring, nor shown, mounted within the panel casing 6 in register with the operating unit 18 for biasing the switch 17 in the extending direction and a thrusting member 19 mounted in the vicinity of ah upper corner of the lower half 8 on the opposite side major surface of the operating panel 5 shown in FIG. 2. The thrusting portion 19 has a recess 22 on its periphery and a retention protrusion 23 on its lateral side for being retained by a lock lever 61 of an opening/closure mechanism 60 as later explained.

Since the opening/closure switch 17, described above, is usually biased in the extending direction by the expansion spring, not shown, the operating unit 18 is formed flush with the upper half 7 constituting one of the major surfaces. If the operating unit 18 is thrust with a finger, the extension spring is contacted against the resilient force, such that the thrusting member 19 is protruded from the opposite side major surface of the operating panel 6.

The major surface of the operating panel 5 is provided with a connection terminal 20 on the opposite side major surface thereof for making electrical connection with a printed circuit board contained in the panel casing 6. This connection terminal 20 is provided in a recess 21 formed in the opposite side major surface of the operating panel 5 in the vicinity of the thrusting member 19 of the opening/closure switch 17. This connection terminal 20 is connected to an opposite side connection terminal arranged on the main apparatus portion 25 in the closed position of the operating panel 5.

Figure 2:
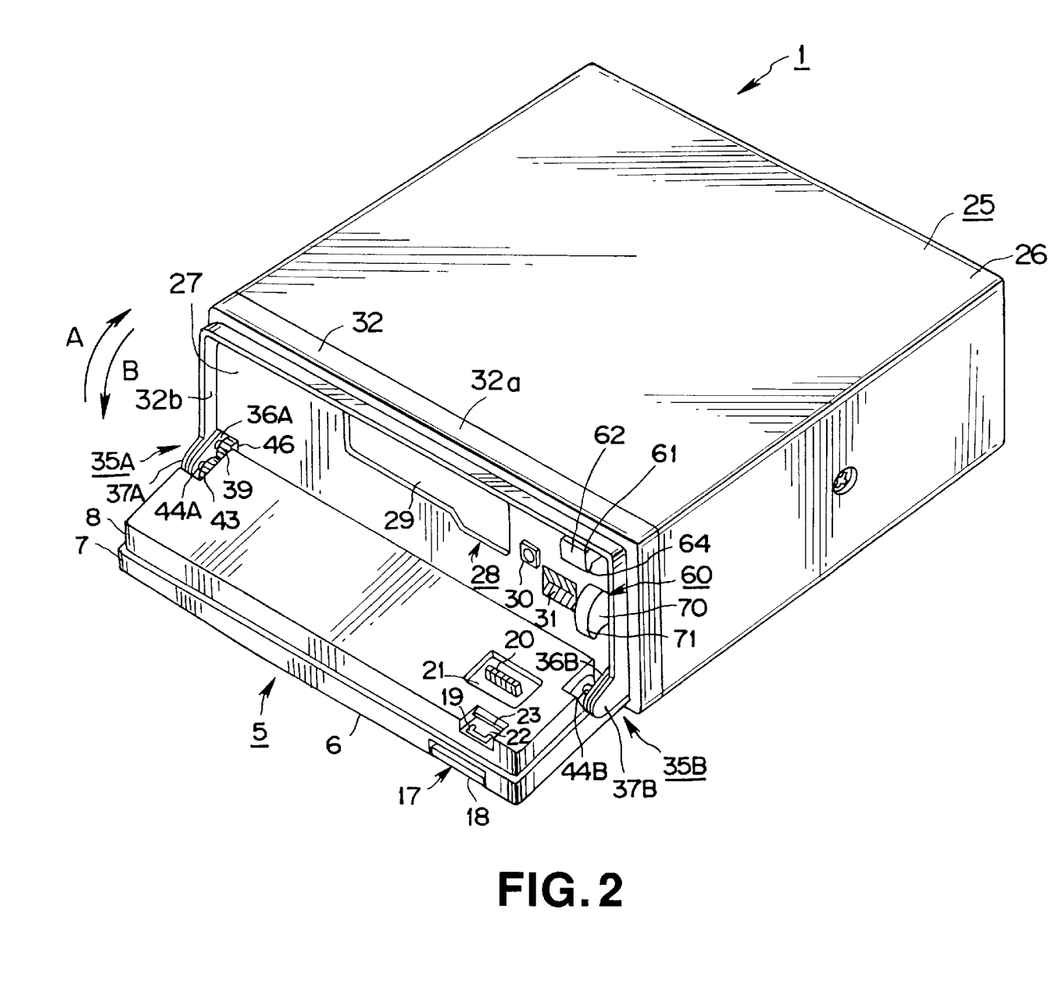
FIG. 2 is a perspective view of the recording and/or reproducing apparatus with the operating panel being opened.

The main apparatus portion 25 has a casing 26 for mounting the operating panel 5 thereon and a second operating unit 28 for performing the operation of the recording and/or reproducing apparatus 1, as shown in FIG. 2.

The casing 26 is formed in a rectangular shape and is formed of a metallic material, such as aluminum (Al). On a front of the casing 26, that is the lateral side thereof exposed to the inside of the vehicle when the casing is assembled in the vehicle, there is formed a mounting surface 27 for mounting the operating panel 5. Within the casing 26 are mounted a driving mechanism, not shown, for driving the tape cassette 80, and the recording and/or reproducing mechanism for recording and/or reproducing the recording medium, as described above.

The second operating unit 28 is mounted on the mounting surface 27, and includes a recording medium inserting/ejecting aperture 29 and an actuating key 30 in the vicinity of the inserting/ejecting aperture 29 which is formed at a mid portion of the mounting surface 27 and adapted for inserting the tape cassette 80.

The recording medium inserting/ejecting aperture 29 is formed at a mid portion of the mounting surface 27 so as to be larger in area than the cross-sectional area of the tape cassette of the tape cassette 80. The tape cassette 80 is inserted into or ejected out of the apparatus via this recording medium inserting/ejecting aperture 29.

Although the recording medium inserting/ejecting aperture 29 for insertion/ejection of the tape cassette 80 has been explained above, the shape of the aperture 29 is not limited to that described above and may be matched to the cross-sectional shape of, for example, a disc-shaped recording medium if one is used.

The operating key 30 is arranged on the mounting surface 27 in the vicinity of the inserting/ejecting aperture 29. As the operating key 30, such a key as is used less frequently than the actuating key of the first operating unit 9 is used. An example of such operating key is one used only with the operating panel in a closed position and having the function of taking out the tape cassette 80 accommodated within the recording and/or reproducing apparatus 1.

In the vicinity of the operating key 30 on the mounting surface 27 is arranged a connection terminal 31 electrically connected to a connection terminal 20 on the operating panel 5. In the closed position of the operating panel 5, the connection terminal 31 is electrically connected to the connection terminal 20 for enabling the actuation of the first operating unit 9.

On the mounting surface 27 is arranged a connection terminal 31 electrically connected to the connection terminal 20 of the operating panel 5. In the closed position of the operating panel 5, the connection terminal 31 is electrically connected to the connection terminal 20 for enabling the operation of the first operating unit 9 of the operating panel 5.

On the mounting surface 27 is arranged an operating panel supporting member 32 having a fitting portion 32b on the outer periphery of which is engaged the operating panel 5 in the closed position. The operating panel supporting member 32 has a mounting portion 32a for mounting and supporting the operating panel supporting member 32 on the main apparatus portion 25 and a fitting portion 32b having an aperture substantially equal in size to an aperture in the lower half 8 constituting the operating panel 5. The fitting portion 32b is constituted by an upstanding peripheral wall set upright from the mounting portion 32a. Thus, in the opened position, the lower half 8 is fitted with the fitting portion 32b for being positively supported by the operating panel supporting member 32.

While the casing 26 is formed of a metallic material, the operating panel supporting member 32 is formed of the same material as that of the upper and lower halves 7, 8 of the operating panel 5, that is a synthetic resin material, such as polyacetal resin. Thus, when the recording and/or reproducing apparatus is mounted on a vehicle, since the mounting surface 27 and the operating panel 5 are formed of the same material, any alien feeling in appearance may be diminished.

The operating panel 5 and the main apparatus portion 25, having the above function, are supported opening/closure by supporting units 35A, 35B as now explained.

That is, the supporting units 35A, 35B are provided with a pair of mounting pieces 36A, 36B, as pivot portions provided on lower corners of the mounting surface 27 of the main apparatus portion 25, and with mounting piece covers 37A, 37B formed parallel to the outer sides of the mounting pieces 36A, 36B for being protruded from the operating panel supporting member 32. The supporting units 35A, 35B are also provided with a first gear 38 and a second gear 39 provided in the vicinity of the mounting pieces 36A, for meshing with each other and a recess 40, as a pivoted portion, positioned on the opposite side of the operating panel 5 and engaged by the mounting piece 36B. The supporting units 35A, 35B are further provided on one side of the operating panel 5 with a protrusion 42 having a recess 4o, as a pivoted portion, adapted for being moved in the direction of the rotational axis and adapted for being engaged by the mounting piece 36A, and with a third gear 43 provided on one side of the operating panel 5 meshing with the second gear 39.

The mounting pieces 36A, 36B are formed semi-arcuately on the whole by being protruded from the lower corners of the mounting surface 27 of the casing 26. The mounting pieces 36A, 36B are formed integrally with the casing 26, and hence are formed of the elastically deformable metallic material as is the material of the casing 26. The mounting pieces 36 are formed with protrusions 44A, 44B facing each other and pivotally supporting the recesses 40, 41 of the operating panel 5. When detaching the operating panel 5, the mounting pieces 36A, 36B are elastically deformed in the directions C and D in FIG. 3 to facilitate dismounting of the operating panel 5.

The protrusions 44A, 44B are rounded at the distal ends thereof so that these protrusions 44A, 44B are rendered slippery with respect to the contact surface of the operating panel 5 when mounting the operating panel 5.

The mounting piece covers 37A, 37B, protruded from the lower corners of the operating panel supporting member 32, are mounted parallel to the outer surfaces of the mounting covers 36A, 36B. The mounting piece covers are formed integrally with the operating panel supporting member 32 and formed of the same synthetic resin material as that of the operating panel supporting member 32, that is polyacetal resin. Since the mounting pieces 36A, 36B formed of metallic material are not exposed to outside, thee is little risk that the alien appearance be produced in the vicinity of the supporting units 35A, 35B of the recording and/or reproducing apparatus 1 by the mounting piece covers 37A, 37B.

Figure 3:
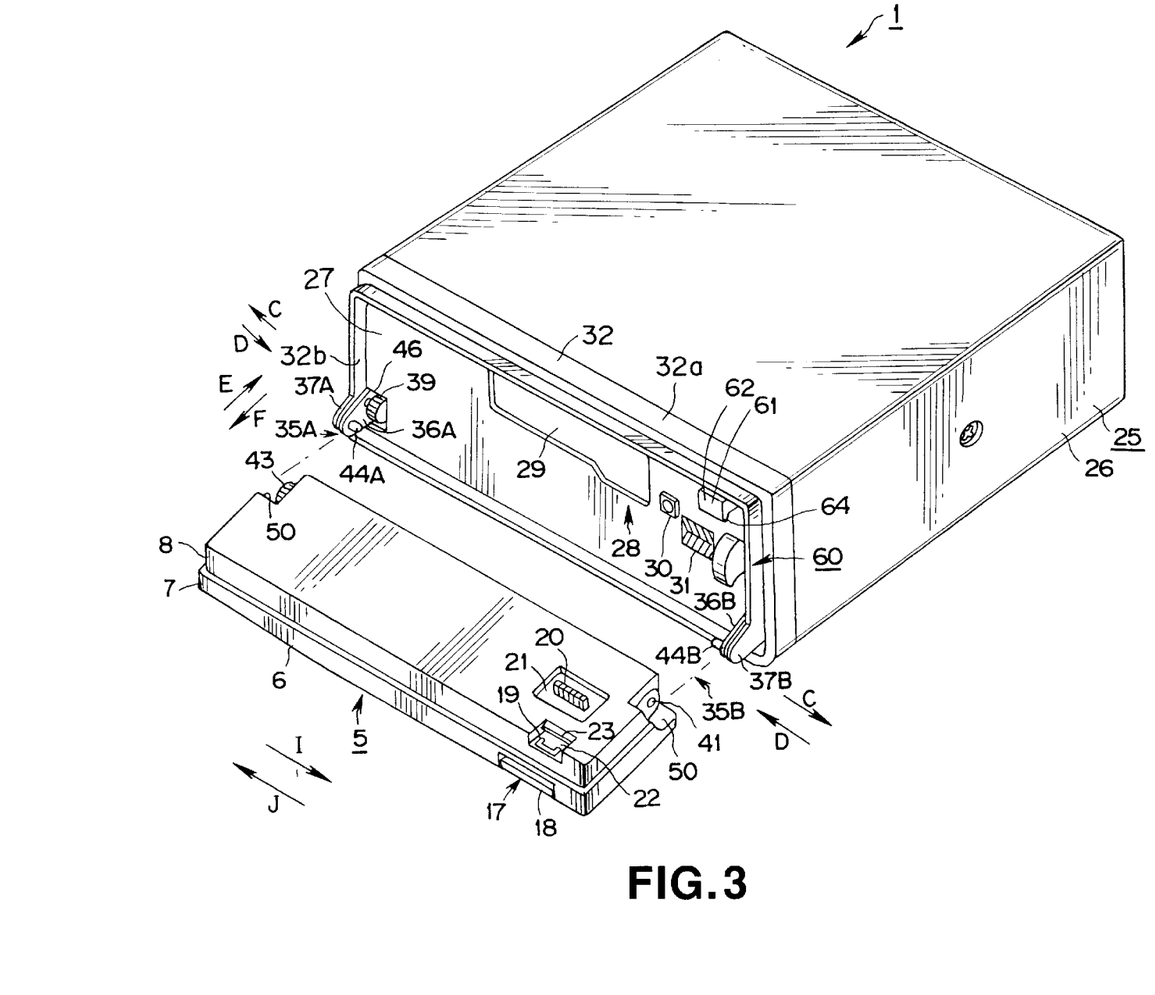
FIG. 3 is a perspective view of the recording and/or reproducing apparatus with the operating panel detached from the main portion of the apparatus.
Figure 4:
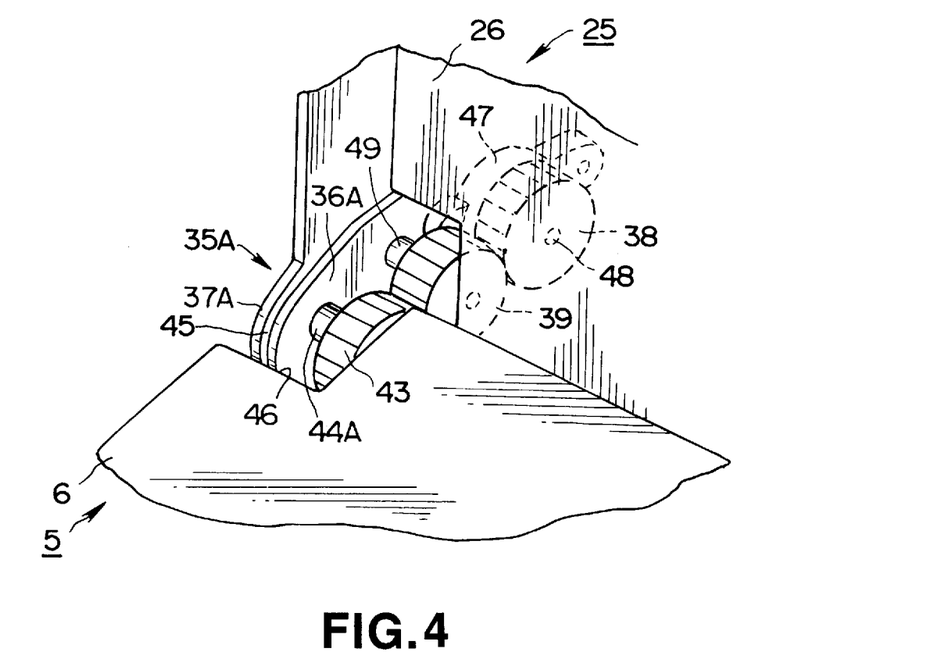
FIG. 4 is a schematic perspective view showing a supporting mechanism for mounting the operating panel on the main portion of the apparatus.

Between the mounting piece covers 37A, 37B and the mounting pieces 36A, 36B, there is formed a clearance 45, as shown in FIG. 4. This clearance 45 is provided for providing a space within which the mounting pieces 36A, 36B is moved in directions shows by arrows C and D in FIG. 3 when mounting and dismounting the operating panel 5.

The first gear 38 and the second gear 39 are provided in the vicinity of a cut-out 46 formed on one side of a lower corner of the mounting surface 27. The first gear 38 is rotatably mounted on a buffer mechanism 47 provided on an inner lateral side of the casing 26 in the vicinity of the cut-out 46. Although not shown, a fin slightly smaller than the outer shape of the buffer mechanism 47 is rotatably housed within the buffer mechanism 47. Within the inside of the buffer mechanism 47 is charged a viscous fluid, such as silicon oil. This viscous fluid inhibits high-speed rotation of the gear housed within the buffer mechanism 47. Since the viscous fluid inhibits high-speed rotation of the fin, the speed of the opening/closure movement of the operating panel 5 connected via the first gear 38 and the second gear 39 is moderated. The first gear 38 is connected by a supporting shaft 48 to the fin housed within the buffer mechanism 47. The first gear 38 is rotatably arranged with the gear 38 being supported by the supporting shaft 48 on the buffer mechanism 47.

The second gear 39 is arranged in the vicinity of the cut-out 46 in the position of neighboring to and meshing with the first gear 38. Similarly to the first gear 38, the second gear 39 is supported for free rotation by a supporting shaft 49.

The buffer mechanism 47, first gear 38 and the second gear 39, constructed as described above, are formed of a synthetic resin material, such as polyacetal resin, as are the operating panel 5 and the operating panel supporting member 32. Although the buffer mechanism 47, first gear 38 and the second gear 39 are partially exposed to outside at the time of opening/closure of the operating panel 5, there is no risk of detracting from the appearance because the buffer mechanism 47, first gear 38 and the second gear 39 are formed of the same material.

On the other hand, pivoted portions are formed on both sides of the lower corners of the operating panel 5.

On the corner of the operating panel 5 is formed a cut-out recess 50 in which the protrusion 42 is formed for movement along the opening/closure axis, that is in directions shown by arrows C and D in FIG. 3.

Figure 5:
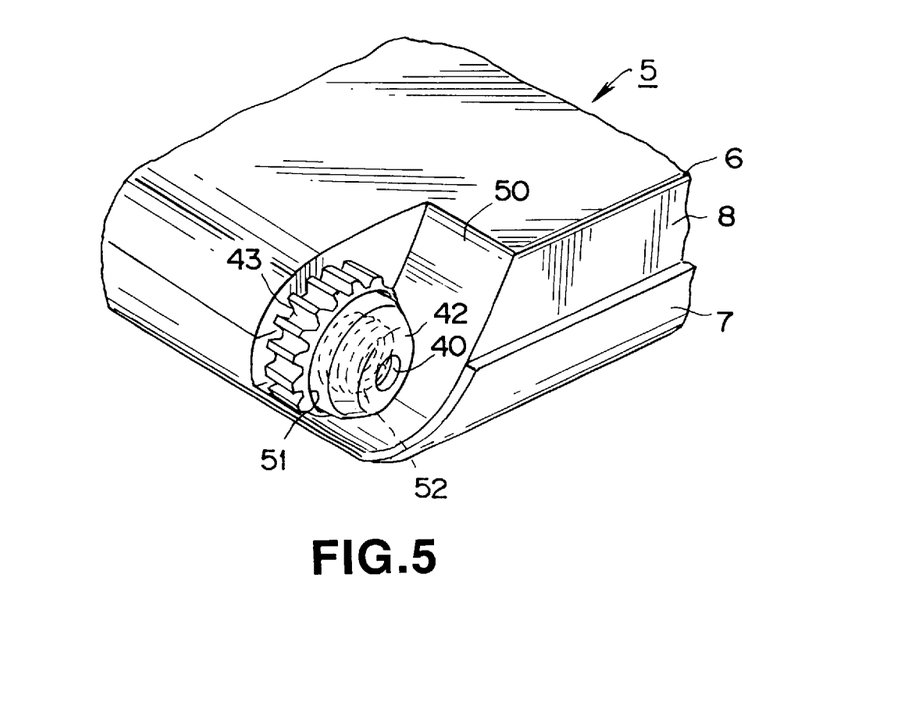
FIG. 5 is a schematic perspective view showing a protruding portion of the operating panel constituting a supporting mechanism for the recording and/or reproducing apparatus.

The protrusion 42 is formed in a semi-spherical shape having an inner space and having a semi-arcuate surface, as shown in FIG. 5. The protrusion 42 has a recess 40 at a mid portion of the arcuate surface. The recess 40 is engaged by the protrusion 44A on the mounting piece 36A. The protrusion 42 has a semi-arcuate surface so that the protrusion 44A of the mounting piece 36A becomes slippery such that the recess 40 can be easily engaged by the protrusion 44A.

The protrusion 42 is mounted in the fitting opening 51 formed in the panel casing 6. Thus the fitting opening 51 is of a diameter substantially equal to the diameter of the protrusion 42. The protrusion 42, thus formed, is engaged in the fitting opening 51 provided in the cut-out recess 50. The protrusion 42 has an extension formed on its periphery. This extension is abutted against the inner rim of the fitting opening 51 for being prohibited from being protruded outwards.

An extension spring 52 for thrusting the protrusion 42 outwards is provided in the inner spacing of the protrusion 42. The extension spring 52 has its one end supported by a stop wall, not shown, provided in the vicinity of the fitting opening 51 within the casing 26, while having its other end supported by the inner wall of the protrusion 42. The protrusion 42 is thrust outwards by the resilient force of the extension spring 52.

The third gear 43 integral with the panel casing 6 is formed at a lower corner of the operating panel 5. This third gear 43 is engaged with the third gear 39 on the main apparatus portion 25 in the pivotally supported state of the operating panel by the mounting piece 36A, that is in the state in which the protrusion 44A is fitted in the recess 40.

The other side of the operating panel 5 is formed with a cut-out recess 53 slightly smaller than the cut-out recess 50. The cut-out recess 53 is formed with the recess 41 engaged by the protrusion 44B of the other mounting piece 36B. On the periphery of the recess 41 is formed an arcuate surface slightly extended outwards as is the protrusion 42. The protrusion 44B of the mounting piece 36B is slippery to permit the recess 41 to be engaged by the protrusion 44B.

The operating panel 5 is mounted by the above supporting units 35A, 35B on the main apparatus portion 25. Although the above-described operating panel 5 has the protrusion 42 formed on one lower corner of the operating panel 5, the protrusion 42 may also be formed on each lower corner of the panel 5.

When in the closed position, the above-described operating panel 5 is locked by an opening/closure mechanism 60, as now described, for being prohibited from opening.

The opening/closure mechanism 60 includes a lock lever 61 in an upper corner of the mounting surface 27 of the main apparatus portion 25 for locking the operating panel 5 in the closed position and a push lever 70 for thrusting the closed operating panel 5 in the opening direction. The lock lever 61 and the push lever 70 face the outer side of a cut-out recess 69 formed in the mounting surface 27 of the main apparatus portion 25.

The lock lever 61 has a major surface 62 thrust by a thrusting portion of the opening/closure switch 17, a recess 63 for retaining a protrusion 72 of a pushlever 70 on a lateral side thereof, and a retainer 64 formed on a lateral edge of the major surface.

The lock lever 61 has its other end not having the major surface 62 rotatably fulcrumed by a pivot 65 of the casing 26. The pivot 65 carries not only the lock lever 61 but also a coil spring 66. This coil spring 66 has its one end retained by a retainer 67 of the casing 26, while having its other end retained by a retainer 68 of the lock lever 61. The coil spring 66 biases the lock lever 61 in a direction shown by arrow G in FIG. 6.

A pushlever 70 is arranged adjacent to the lock lever 61 and is made up of a thrusting portion 71 and a protrusion 72 retained by the recess 63 provided in the local lever 61.

The thrusting portion 71 is formed semi-arcuately at one end of the pushlever 70. Since the thrusting portion 71 is formed semi-arcuately in this manner, it can thrust the operating panel 5 along the semi-arcuate surface for performing the lid-opening operation.

The protrusion 72 is engaged in the recess 63 formed in the lock lever 61 so that the protrusion 72 is shaped for mating with the recess 63. The protruding degree of the protrusion 72 is set so that, if, with the protrusion 72 fitted in the recess 63, the major surface 62 of the lock lever 61 is thrust and moved in a direction shown by arrow H in FIG. 6, the fitted state of the protrusion is released.

The pushlever 70 has its end not having the thrusting portion 71 rotatably fulcrumed by a pivot 73 of the casing 73. The pivot 65 carries not only the pushlever 70 but also a coil spring 74. This coil spring 74 has its one end retained by a retainer 75 of the casing 26, while having its other end retained by a retainer 76 of the lock lever 70. The coil spring 66 biases the lock lever 61 in a direction shown by arrow G in FIG. 6.

The above-described recording and/or reproducing apparatus performs the opening/closure operation of the operating panel 5 as follows:

In the recording and/or reproducing apparatus, the operating panel 5 in its closed position closes the mounting surface 27 of the main apparatus portion 25, as shown in FIG. 1. The second gear 39 of the supporting units 35A, 35B is engaged with the third gear 43 of the operating panel 5. The protrusion 44A of the mounting piece 36A is fitted in the recess 40 of the protrusion 40, while the protrusion 44B of the mounting piece 36B is fitted in the recess 41. The extension spring 52 arranged in the protrusion 42 thrusts the protrusion 42 towards the mounting piece 36A for steadily fulcruming the operating panel 5 by the mounting pieces 36A, 36B.

Figure 6:
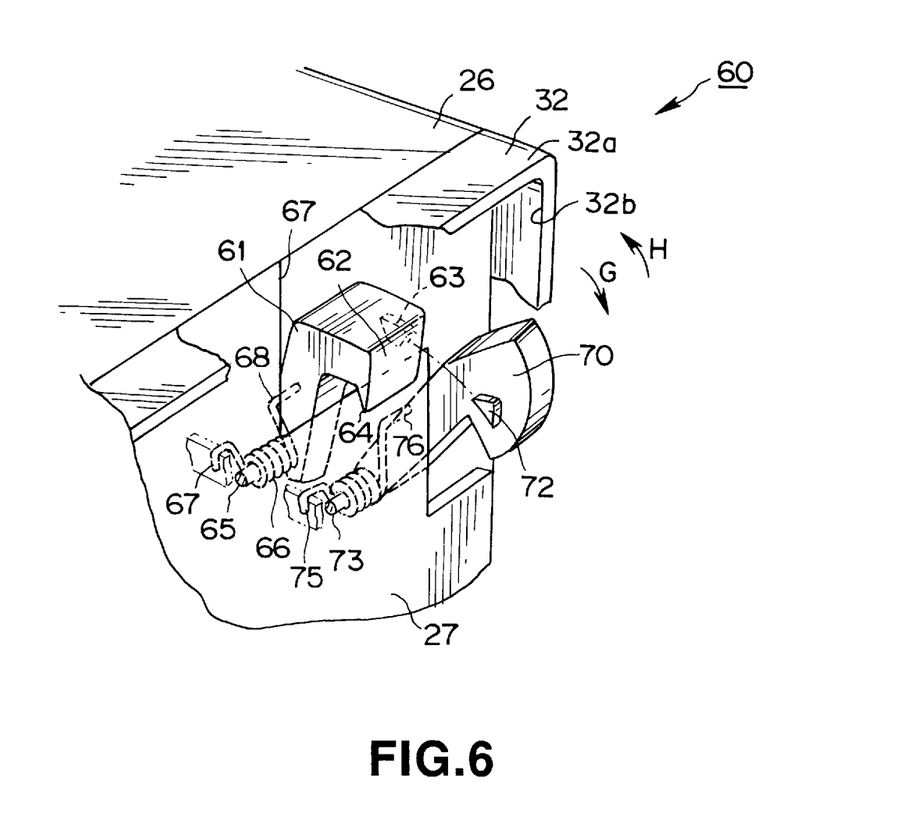
FIG. 6 is a schematic perspective view showing an opening/closure mechanism for locking the operating panel on the main portion of the recording and/or reproducing apparatus.
Figure 7:
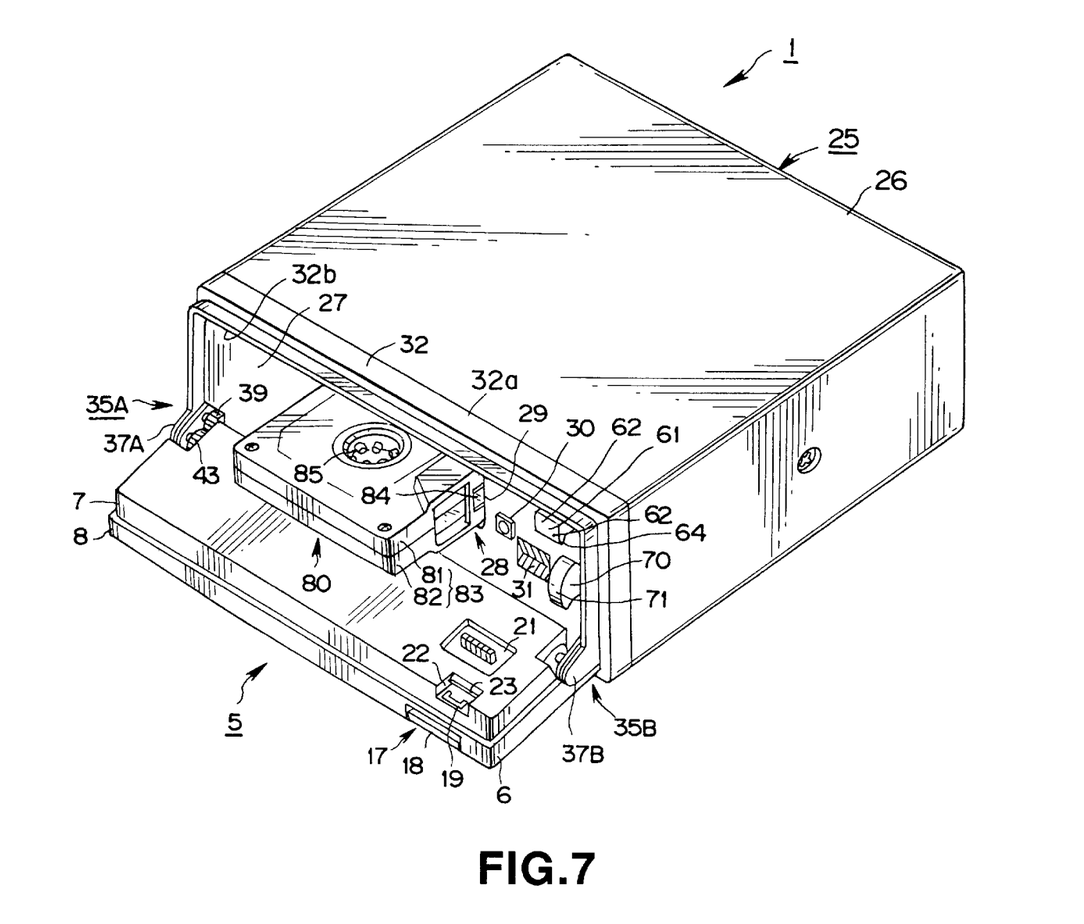
FIG. 7 is a perspective view showing the state of insertion of the tape cassette in the recording medium insertion/ejection aperture formed in the mounting surface in the opened state of the operating panel.

With the opening/closing mechanism 60, the lock lever 61 and the pushlever 70 are biased in a direction shown by arrow H in FIG. 6, with the recess 63 in the lock lever 61 being fitted on the protrusion 72 of the pushlever 70. The retainer 64 of the lock lever 61 is retained by the retention protrusion 23 of the recess 22 provided around the rim of the operating unit 18 of the operating panel 5. The operating panel 5 is retained by the retention protrusion 23 of the recess 23 so that it is locked against inadvertent opening.

If, in this state, the operating unit 10 for the opening/closure switch 17 in the recording and/or reproducing apparatus is thrust, the extension spring provided within the interior of the panel casing 6 is contracted for protruding the thrusting member 19 of the lower half 8. This thrusting member 19 is thrust against the major surface 62 of the lock lever 61 making up the opening/closure mechanism 60. The lock lever 61 has its major surface 62 thrust by the operating unit 18 so that it is rotated in a direction indicated by arrow G in FIG. 6. With the operating panel 5, the recess 63 in the lock lever 61 is disengaged from the protrusion 72 of the pushlever 70, while the retainer 64 of the lock ever 61 is disengaged from the retention protrusion 23 of the recess 22 formed around the operating unit 18 of the operating panel 5, thus enabling the opening in the direction shown by arrow B in FIG. 2.

The operating panel 5 is opened in the direction shown by arrow B in FIG. 2. Since the buffer mechanism 47 of the supporting units 35A, 35B has the viscous fluid charged in the inside thereof, the operating panel performs smooth opening movement via first gear 38, second gear 39 and third gear 43. The recording and/or reproducing apparatus 1 is in such a state in which the operating panel 5 is opened and the insertion/ejection aperture 29 is exposed to outside. This state is the state of insertion of the tape cassette 80. The tape cassette 80 is made up of a main cassette portion 83, formed by upper and lower saucer-shaped halves 81, 82 and a magnetic tape for recording speech signals or the like wound about a pair of tape reels 85 housed within the interior of the cassette main portion 83. The cassette main portion 83 has an aperture 84 in its lateral surface via which is extended the above magnetic tape.

When the tape cassette 80 is thrust via the insertion/ejection aperture 29 into the inside of the recording and/or reproducing apparatus 1, a magnetic tape driving unit of the recording and/or reproducing apparatus 1 is engaged with the tape reel 85, while the magnetic head of the recording and/or reproducing apparatus 1 is intruded into an aperture 84, for enabling recording/reproduction.

With the recording and/or reproducing apparatus 1, when the operation of inserting the tape cassette 80 into the insertion/ejection aperture 29 comes to a close, the operation of closing the operating panel 5 is performed manually or automatically.

In the opened position of the operating panel 5, the opening/closure mechanism 60 is in such state in which the lock lever 61 and the pushlever 70 are biased in a direction shown by arrow G, as shown un FIG. 6, with the recess 63 of the lock lever 61 not being engaged with the protrusion 72 of the push lever 70. When the operating panel 5 is closed in the direction shown by arrow A in FIG. 2, the lower half 8 of the operating panel 5 is abutted against the thrusting portion 71 of the push lever 70 constituting the opening/closure mechanism 60. If the operation of opening the operating panel 5 in the direction of arrow A is continued, the thrusting portion 71 is rotated in the direction shown by arrow H in FIG. 6. The protrusion 72 of the pushlever 60 is fitted within the recess 63 of the lock lever 61. Simultaneously, the retainer 64 of the lock lever 61 is retained by the recess 22 formed in the lower half 8 for locking the operating panel 5 against opening.

The operating panel 5 can be dismounted in its opened position.

The second gear 39 of the supporting units 35A, 35b of the recording and/or reproducing apparatus 1 is engaged with the third gear 43 of the operating panel 5. The protrusion of the mounting piece 36A is fitted in the recess 40 of the protrusion 40, while the protrusion 44B of the mounting piece 36B is fitted in the recess 41. The extension spring 52 provided in the protrusion 42 thrusts the protrusion 42 against the mounting piece 36A for reliably pivoting the operating panel by the mounting piece 36.

In the recording and/or reproducing apparatus, when the operating panel 5 is thrust in a direction indicated by arrow J in FIG. 3, the protrusion 42 thrust outwards by the extension spring 52 is contracted by the extension spring 52 so as to be moved inwards. The operating panel 5 is released from the state in which the recess 41 formed in the operating panel 5 is released from the protrusion 44B of the mounting piece 36B. In this state, the operating panel 5 is pulled in the direction shown by arrow F in FIG. 3. At this time, the mounting piece 36A thrust by the operating panel 5 is thrust by the operating panel 5 outwards, that is in the direction C shown by arrow F in FIG. 3, so that the mounting piece 36A is elastically displaced in a direction shown by arrow C in FIG. 3. The operating panel 5 has the protrusion 42 moved inwards, while the mounting piece 36A is moved in the direction shown by arrow C in FIG. 3, so that the operating panel 5 is dismounted easily.

The operating panel 5, dismounted from the main apparatus portion 25, is mounted on the main apparatus portion as follows: First, the operating panel has its recess 41 fitted with the protrusion 44B of the mounting piece 36B of the supporting unit 35B. At this time, the operating panel 5 thrusts the mounting piece 36B outwards, that is in the direction of arrow C in FIG. 3. Thus the mounting piece 36B is elastically displaced in the direction of arrow C in FIG. 3.

Next, with the recess 41 of the operating panel 5 and the protrusion 44B of the mounting piece 36B engaged with each other and thrust outwards together, the protrusion 44A of the mounting piece 36A is moved towards the protrusion 44A of the mounting piece 36A in the direction indicated by arrow E in FIG. 3. Thus the protrusion 42 is caused to bear against the protrusion 44A and thrust further so as to be moved inwards against the elasticity of the extension spring 52. Thus the protrusion 44A is moved along the curved surface of the protrusion 42 into engagement with the recess 40. The arcuate surface of the protrusion facilitates movement of the protrusion 44A.

During mounting of the operating panel 5, the mounting piece 36A is elastically displaced by being thrust by the protrusion 42 outwards, that is in the direction of the arrow C in FIG. 3. The operating panel 5 can be mounted easily on the main apparatus portion 25 because the mounting piece 36 is elastically displaced in the direction of arrow C in FIG. 3, with the protrusion 42 being moved inwards against the resiliency of the extension spring 52.

With the above-described structure of the recording and/or reproducing apparatus 1, the dismounting operation of the operating panel 5 may be realized easily. When the user alights from the vehicle carrying this recording and/or reproducing apparatus 1, the operating panel 5 can be dismounted and carried easily. By separating the operating panel 5 from the main apparatus portion 25 mounted inside the vehicle, the apparatus can be identified to be a recording and/or reproducing apparatus only with difficulty thus preventing theft from occurring.

What is claimed is:

1. An electronic apparatus comprising:

a main apparatus portion;

a front panel having an operating unit including at least an operating switch, said front panel being arranged on the front side of said main apparatus portion; and a supporting mechanism for rotatably supporting said front panel relative to said main apparatus portion, wherein said front panel is rotable about an axis of rotation, said supporting mechanism supporting said front panel for rotation between a position parallel to the front surface of the main apparatus portion and a position rotated from the front surface of the main apparatus portion, said supporting mechanism including:

a shaft provided in one of the front panel and the main apparatus portion and a bearing mounted in the other of the front panel and the main apparatus portion, one of the shaft and the bearing being slidably mounted to move parallel to the axis of rotation, wherein the front panel is removed from the main apparatus portion when the slidably mounted shaft or bearing is moved away from the other of the shaft or bearing so that the shaft and bearing are disengaged from one another;

a gear provided on one of the main apparatus portion and the front panel and a buffer mechanism provided on the other of the main apparatus portion and the front panel, the buffer mechanism being engaged with said gear for slowing a rotational speed of the gear; and biasing means for biasing said bearing in the direction of the rotational axis toward the shaft, whereby the bearing and shaft are normally engaged with one another, said biasing means having the gear formed thereon.

2. The electronic apparatus as claimed in claim 1 wherein said supporting mechanism has a further gear meshing with the first-stated gear when the shaft and bearing are engaged and wherein the buffer mechanism slows the rotational speed of the further gear.

3. The electronic apparatus as claimed in claim 1 further comprising transmission means for transmitting an input signal from said operating unit to said main apparatus portion when the front panel is at a position parallel to the front side of the main apparatus portion.

4. The electronic apparatus as claimed in claim 1 further comprising lock means for locking the front panel when the front panel is at a position parallel to the front surface of the main apparatus portion.

5. A recording and/or reproducing apparatus for a recording medium comprising:

a main apparatus portion for housing recording and/or reproducing means for the recording medium, with an insertion/ejection aperture for the recording medium being formed on the front side of the main apparatus portion;

a front panel having an operating unit having at least one operating switch, said front panel being arranged on the front side of the main apparatus portion; and a supporting mechanism for supporting the front panel for rotation about an axis of rotation relative to the main apparatus portion, said supporting mechanism supporting said front panel for rotation between a position closing said aperture in the main apparatus portion and a position opening said aperture, said supporting mechanism including:

a shaft provided in one of the front panel and the main apparatus portion and a bearing mounted in the other of the front panel and the main apparatus portion along the axis of rotation, one of the shaft and the bearing being slidably mounted to move parallel to the axis of rotation, wherein the front panel is removed from the main apparatus portion when the slidably mounted shaft or bearing is moved away from the other of the shaft or bearing;

a gear provided on one of the main apparatus portion and the front panel and a buffer mechanism provided on the other of the main apparatus portion and the front panel, said buffer mechanism being engaged with said gear for slowing the rotational speed of said gear; and biasing means for biasing said bearing in the direction of said rotational axis toward the shaft, whereby the bearing and shaft are normally engaged with one another, said biasing means having said gear formed thereon.

6. The electronic apparatus as claimed in claim 5 wherein said supporting mechanism has a further gear meshing with the first-stated gear when the bearing and the shaft are engaged and wherein the buffer mechanism slows the rotational speed of the further gear.

7. The electronic apparatus as claimed in claim 5 further comprising transmission means for transmitting an input signal from said operating unit to said recording and/or reproducing means when said front panel is at a position closing said aperture.

8. The electronic apparatus as claimed in claim 5 further comprising lock means for locking said front panel when said front panel is at a position parallel to the front side of said main apparatus portion.

* * * * *